United States Patent [19]

Haubus

[11] Patent Number: 4,916,792

[45] Date of Patent: Apr. 17, 1990

[54] CLUTCH ALIGNMENT TOOL

[76] Inventor: Waldemar Haubus, 24 Federal Parade, Brookvale, New South Wales, 2011, Australia

[21] Appl. No.: 190,870

[22] Filed: May 6, 1988

Related U.S. Application Data

[63] Continuation-in-part of Ser. No. 894,417, Aug. 8, 1986, abandoned.

[51] Int. Cl.[4] .............................................. B23P 19/04

[52] U.S. Cl. ........................................ 29/262; 29/263; 29/274; 269/48.1

[58] Field of Search .......................... 29/262, 263, 274; 269/48.1; 81/445

[56] References Cited

U.S. PATENT DOCUMENTS

| | | | |
|---|---|---|---|
| 1,632,720 | 6/1927 | Worster | 29/262 |
| 1,851,421 | 3/1932 | Conklin | 81/445 |
| 1,935,678 | 11/1933 | Valpey | 29/274 |
| 4,507,837 | 4/1985 | Hunkle | 29/262 |

FOREIGN PATENT DOCUMENTS

| | | | |
|---|---|---|---|
| 15206 | of 1886 | United Kingdom | 81/72 |

*Primary Examiner*—Judy J. Hartman

*Attorney, Agent, or Firm*—McDermott, Will & Emery

[57] ABSTRACT

The invention provides a tool for aligning a clutch plate with a pressure plate. The tool includes an externally threaded tube having an adjustable clamping member engaged therewith for axial movement relative thereto. The tube comprises a stepped bore including a step between bore portions of differing diameter. An axially slideable bolt passes through the tube and has a nut at one end and a head at the other end. An elongate insert extends into the bore, and at one end thereof abuts against the step within the bore. The other end of said insert is formed as an enlarged deformable portion and is adapted to be radially expanded by the head of the bolt being drawn into it when the nut is tightened.

6 Claims, 3 Drawing Sheets

CLUTCH ALIGNMENT TOOL

BACKGROUND TO THE PRESENT INVENTION

This application is a continuation-in-part out of application Ser. No. 894,417, filed Aug. 8, 1986, now abandoned.

THE INVENTION relates to a tool for use in connection with mechanical clutches such as are used on motor vehicles, and is more specifically concerned with a tool for aiding re-assembly or adjustment of a clutch.

A motor vehicle clutch comprises a flywheel rotated by an engine crank shaft, a clutch plate having a splined hub axial movable on splines provided at one end of a main input gearbox shaft which is coaxial with the drive shaft, and a pressure plate attached to and rotatable with the flywheel. A strong spring is provided in the pressure plate which when the clutch is engaged, holds the clutch plate lining in frictional engagement with the lining on the pressure plate and/or friction surfaces on the flywheel so that the clutch plate transmits drive from the drive shaft to the gearbox. When the clutch is to be disengaged, the spring pressure is reduced to allow the clutch plate lining to separate from the surfaces with which they are in contact. The gearbox input shaft then can rotate independently of the drive shaft and the gearbox is disengaged from the engine.

Arrangements have been previously known which have attempted to allow for clutch components (i.e. pressure plates and clutch plates) to be held in juxtaposition to allow assembly, alignment repair and/or adjustment. These arrangements have not however been successful, nor have they been efficient in use and operation. Such known and generally unsatisfactory arrangements are for example, known from U.S. Pat. Specification Nos. 2,599,982; 2,487,504; 2,044,818 and 1,935,678; also from British Patent Specification No. 515,448; Australian Patent Specification No. 206,468 and West German Patent Specification No. U-8,602,006. Also from French Patent specification No. A823,415.

It is an object of this invention to go at least some way towards overcoming or minimizing the short comings of previous arrangements, and to provide a straightforward tool which is efficient in operation.

SUMMARY OF THE INVENTION

According to one aspect of the present invention there is provided a tool for use in centering a clutch plate and clutch pressure plate, comprising a tube having an elongate bore; an axially slidable bolt extending therethough and having a draw nut at one end and a head at its other end; the bore of said tube being stepped along its length; an insert being provided and having a resiliently deformable enlargement at one end thereof; the other end of said insert being located against said step of the bore; the head of said bolt being adapted to be drawn into the interior of said enlargement on tightening of said draw nut, such as to temporarily radially expand said enlargement; and further including adjustable clamping means so formed as to be axially displaceable along the outside of said tube.

The tube of the present invention is preferably externally threaded along its length, the adjustable clamping member preferably being a nut having a lower abutment surface, which can be axially advanced along and relative to the longitudinal axis of the tube, to varying positions along the length of the tube.

The insert preferably comprises an elongate hollow and substantially tubular body portion having an enlargement at one end thereof, the body portion fitting neatly and closely into a wide bore portion of a stepped bore of the tube, so that an inner end thereof is able to abut against the step or abutment of the stepped bore. The other end of the insert is preferably enlarged and may be longitudinally split so that the head of a bolt, (preferably a tapered head), can be drawn into the enlargement so as to expand it. Conveniently the head is formed or provided at one end of an elongate draw bolt, which is passed and extends through the tube and insert, and carries and is engaged with a draw nut at its other end, which projects from the other end of the tube. Thus, by tightening the draw nut, the head of the draw bolt is drawn into the enlargement of the insert causing the enlargement to radially expand. When the enlargement is located and positioned, for example, in the central opening of a clutch plate, the tightening of the draw nut will draw the head into the enlargement, this causing the enlargement to radially expand so as to grip the central opening of the clutch plate tightly. The adjustable clamping member which is axially adjustable relative to the longitudinal axis of the tube, can then be partially tightened down against a pressure plate, so that the clutch plate and pressure plate are held in relative juxtaposition one to the other. Final adjustments to the position of the plates can then be made. The assembly of the two plates held together by the tool can then be bolted back on the flywheel. The tool of the present invention allows for the clutch plate to be held in a desired or chosen position, allowing the grip of the enlargement to be released and the tool to be removed so that an input shaft can be fitted. As the clutch plate will have already been centred with respect to the pressure plate, such a main input shaft can be centred with respect to the drive shaft in a relatively straight forward and efficient manner.

BRIEF DESCRIPTION OF DRAWINGS

The invention will now be described in more details, by way of examples, with reference to the accompanying drawings, in which.

DETAILED DESCRIPTION OF INVENTION

Figure 1:
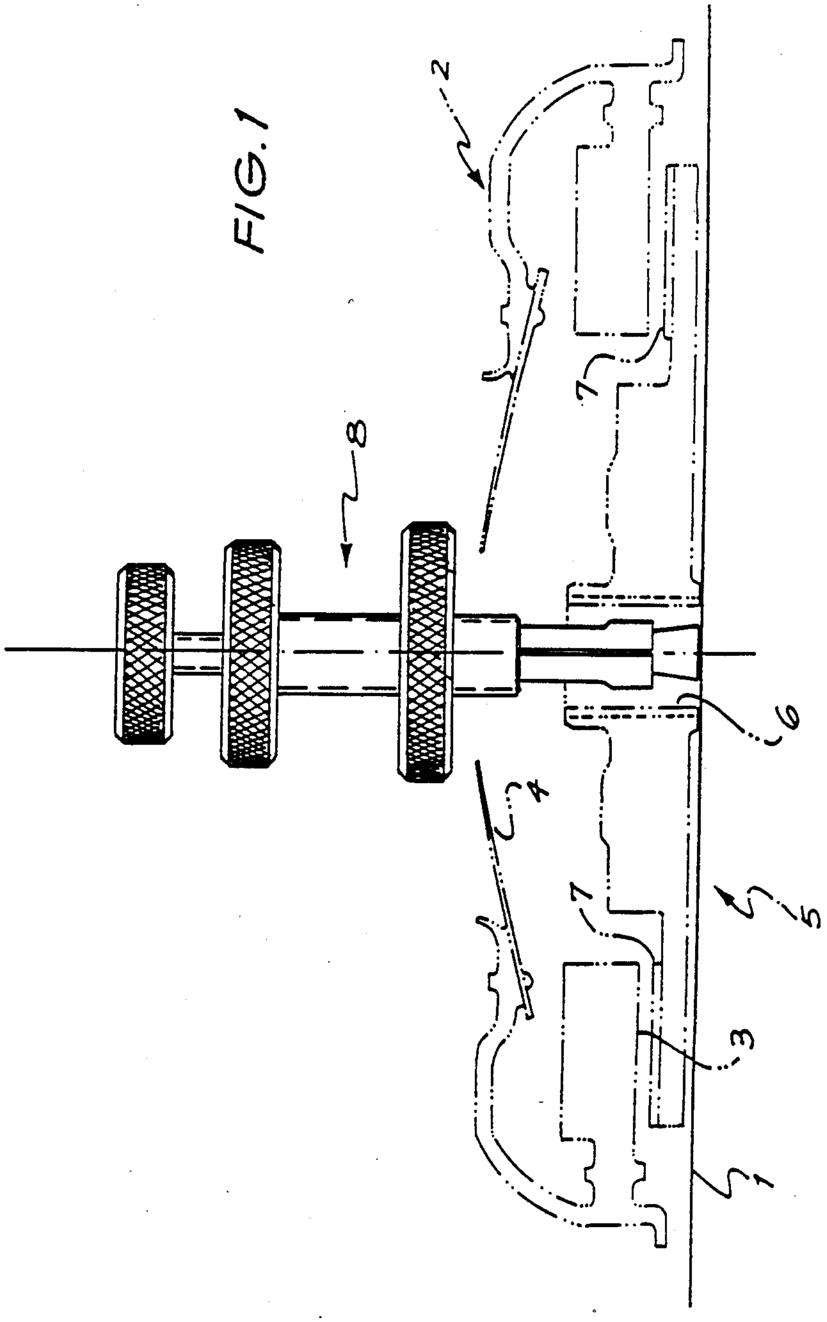
FIG. 1 is a diagrammatic cross-section through a clutch plate to be centered within a pressure plate by a tool shown in outline only.

FIG. 1 shows a clutch plate 5 resting on a table 1 or other flat surface and covered by a pressure plate 2 having a spring diaphragm 4 and an annular surface 3. When the pressure plate 2 forms part of an assembly clutch, its periphery is bolted to a flywheel attached to the engine crank shaft.

The clutch plate 5 has a central splined hub 6 through which a main input gearbox shaft passes when the plate 5 is assembled in the clutch. The peripheral portion of the clutch plate 5 is lined with lining 7 which, when the clutch is engaged, is frictionally gripped between the annular surface 3 and a corresponding surface on the flywheel.

Figure 2:
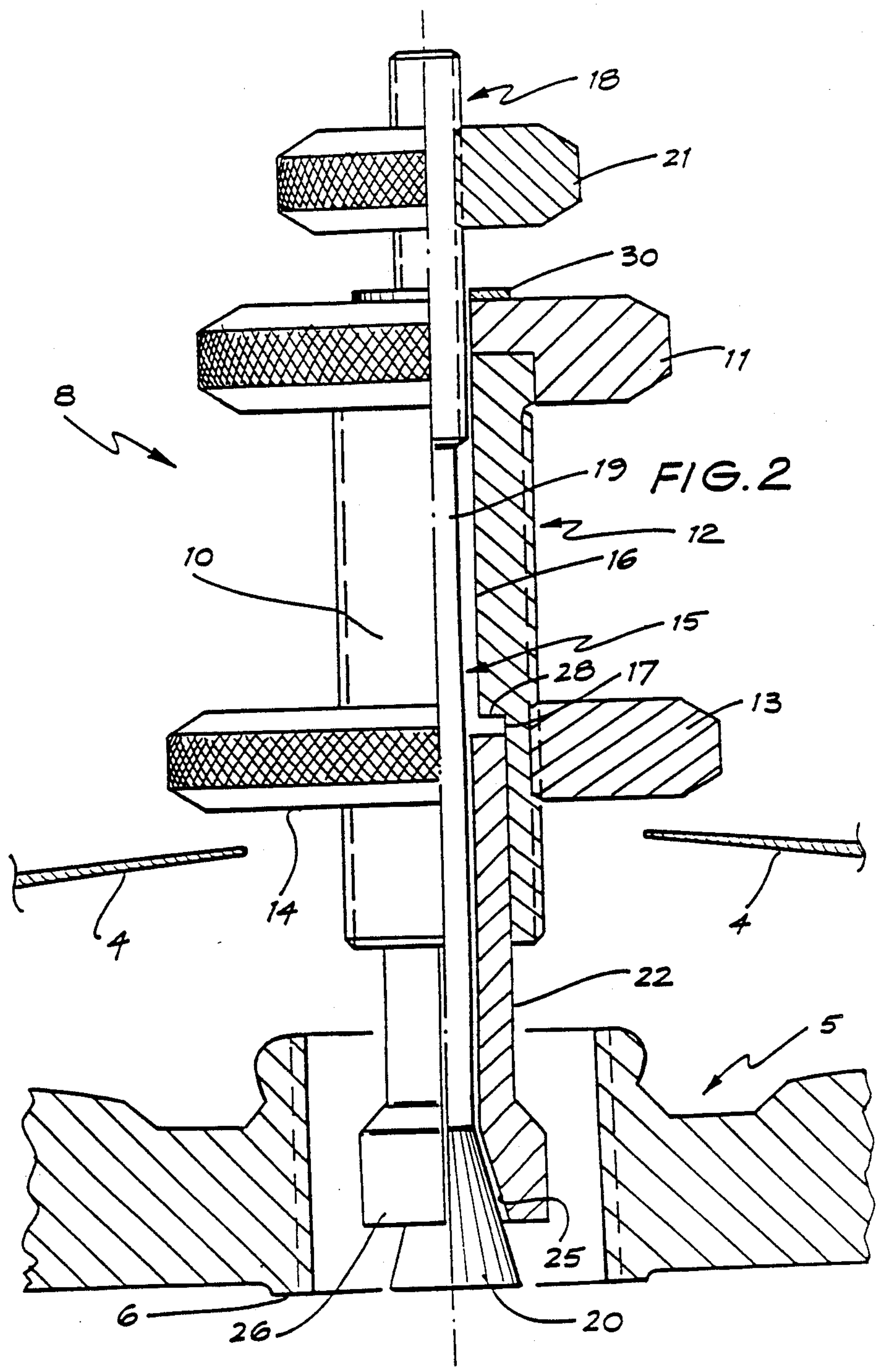
FIG. 2 shows the tool in sectional side elevation.
Figure 3A:
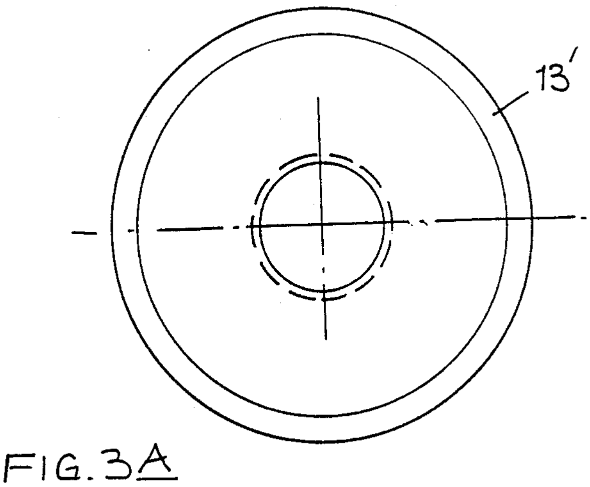
FIG. 3A through 3D shows in simplified outline, parts of an alternative construction of the tool.
Figure 3B:
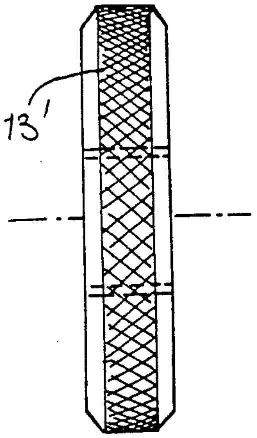
Figure 3C:
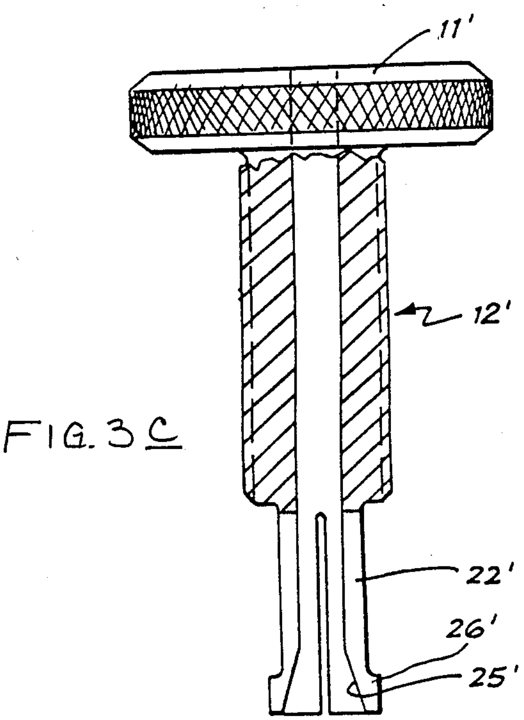
Figure 3D:
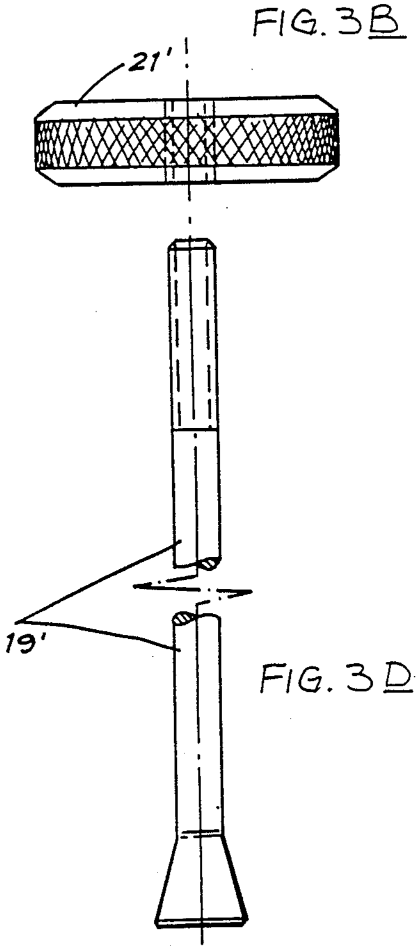

A tool 8 is used to centre the clutch plate 5 relative to the pressure plate 2 and will now be described in more detail with reference to FIG. 2.

The tool 8 comprises a generally cylindrical and elongate tube 10 which is externally threaded along its length and has a knob such as a circular knob 11, at one end.

An adjustment clamping member 13 such as a clamping nut, is also provided and is formed with a substantially centrally located bore which is screw threaded, so that the clamping member 13 can engage, by means of the screw thread, with the outer surface of the tube 10. On such engagement the clamping member 13 can be moved and advanced substantially axially, relative to the longitudinal axis of the tube 10. Preferably the member 13, is in the form of a clamping nut, and is provided with a lower abutment face 14.

The tube 10 is provided with a stepped bore 15 extending therethough, which has a portion 16 of small diameter and a portion 17 of large diameter. An annular abutment portion or step 28 is provided between the bore portions 16 and 17. An insert 22 is provided being an elongate hollow and substantially tubular insert 22 having an enlarged and preferably longitudinally split end 26. The insert 22 is located within the bore portion 17 of larger diameter, and the inner end thereof rests and abuts against the annular step 28 between the bore portions 16 and 17. The insert 22 within the bore 15 of the tube 10 is a close fit, so that the insert 22 and tube 10 are substantially coaxial.

The insert 22 is internally flared at 25 and provided with a resiliently deformable enlargement 26 at its outer end.

An elongate draw bolt 19 having a head 20, such as a frustro-conical head 20 at one end, is extended or passed through the bore portions 16 and 17 of the tube 10 and through the insert 22 so that the upper end thereof exits from the upper end of the tube 10, where it is engaged with a draw nut 21. On the nut 21 being tightened and being moved axially along the length of the bolt 19, it will bear against an upper surface of the knob 11 and cause the head 20 to be drawn upwardly into the resiliently deformable enlargement 26 which is caused to radially expand outwardly.

It is preferred that a washer 30 may be located around the bolt 19 between the draw nut 21 and the knob 11.

The tool of the invention is used as follows:

The clutch plate 5 is placed face down as shown in FIG. 1 of the drawings, on a flat surface 1. The pressure plate 2 is placed carefully over the plate 5 so that its surface 3 is substantially aligned with the lining 7. The tool 8, with nuts 13 and 21 at the upper ends of their permitted axial travel, is engaged or located through the central opening in the pressure plate 2, with the resiliently deformable enlargement 26 being located within the central opening 6 of the clutch plate 5, such as shown in FIG. 1 of the drawings. The draw nut 21 is then tightened which will cause the head 20 of the bolt 19 to be drawn upwardly into the resiliently deformable enlargement 26. Axial movement of the insert 22 within the bore of the tube 10 will be prevented by the inner end of the insert 22 engaging with and against the step 28 between the bore portions 16 and 17. With this secure engagement the continued tightening of the draw nut 21 will cause the head 20 to continue to move within the enlargement 26, which will expand outwardly into a tight gripping engagement with the splined hub 6. The adjustable clamping means 13 is then axially advanced down the outside of the tube 10, such as by hand, until the lower surface 3 thereof comes into contact with the spring 4 of the pressure plate 2. With clutch plate and pressure plate so held together, in juxtapostion, by the tightening of the adjustable clamping member 13, the assembly can then be lifted and/or final adjustments made to the centering and positioning. The clamping means 13 can be tightened or loosened as required. Following adjustment the adjustment member 13 can be screwed down tight against the pressure plate, and the assembly can then be bolted and connected by pressure plate 2 to the fly wheel of the engine crank shaft.

In use, the action of tightening the pressure plate bolts will be to loosen the engagement of the adjustable clamping member 13 with and relative to, the spring diaphragm 4. The draw nut 21 can then be loosened to allow the head 20 of the bolt 19 to be displaced from within the resiliently deformable enlargement 26 which will then revert to a contracted state to allow for it to be withdrawn from within the assembled clutch and hub of the clutch plate.

It has been found that as the clutch plate 5 will have been substantially centred with respect to the pressure plate 2, and the action of bolting the pressure plate to the flywheel is to substantially centre it correctly with respect to the engine crank shaft, the hub 6 and thus the main input shaft will be subtantially aligned one with the other and relatively even wear on clutch linings is obtained.

It is preferred that the insert and resiliently deformable enlargement be formed and constructed of an appropriate resilient and deformable material, such as nylon or plastics material, although other appropriate resilient deformable materials maybe used.

The invention has been described by way of example only and improvements may be made without departing from the scope thereof as defined by the appended claims.

I claim:

1. A tool for centering a clutch plate and a clutch pressure plate having a spring diaphragm, comprising a tube having an elongate bore extending therethrough; an axially slidable bolt extending through said bore and having a draw nut at one end and a head at its other end; the bore of said tube being stepped along its length; an elongate hollow insert being provided within said bore; said axially slidable bolt extending therethrough; said insert having a resiliently deformable enlargement at one end thereof; the other end of said insert being adapted in use to be seated against a step in said bore; tightening of said draw nut causing the the head of said bolt to be drawn into an interior region of said enlargement of said insert, such as to hold an inner end of said insert against the step of said bore and so as to radially expand said enlargement such that the expanded enlargement is able to be brought into engagement with a splined hub of a clutch plate; adjustable clamping means being engaged with an outer surface of said tube so as to be axially displaceable along and relative to the longitudinal axis of said tube, and extending radially outwardly of the longitudinal axis of said tube, such that in use, and on advancement along said tube towards said enlargement, said adjustable clamping means will overlap, engage with and compress the spring diaphragm of said clutch pressure plate; such that when said enlargement is expanded to be brought into engagement with said splined hub, and when said adjustable clamping means is so axially advanced along said tube, so as to overlap, engage with and compress said spring diaphragm of the clutch pressure plate, said adjustable clamping means and said enlargement, operate and co-act to hold said clutch plate and said clutch pressure plate in juxtaposition, such as to allow for relative alignment and mounting thereof.

2. A tool as claimed in claim 1, wherein one end of said insert is longitudinally split, such as to allow said resiliently deformable enlargement to be expanded radially outwardly.

3. A tool as claimed in claim 1 wherein the head of said bolt is of a substantially frustro-conical formation.

4. A tool as claimed in claim 1, wherein the adjustable clamping means is provided with a substantially centrally located screw threaded bore; an outer surface of said tube being externally screw threaded, such that said adjustable clamping means is axially movable along the outer surface of and relative to the longitudinal axis of, said tube.

5. A tool as claimed in claim 1, wherein the insert and enlargement are formed of a resiliently deformable plastics material.

6. A tool as claimed in claim 1, wherein said bore includes a first bore portion of small diameter and a second bore portion of larger diameter, said step being formed and provided between said first bore portion and said second bore portion.

* * * * *